United States Patent [19]

Tang et al.

[11] Patent Number: 5,162,475

[45] Date of Patent: Nov. 10, 1992

[54] POLYMERIZABLE SURFACTANT

[75] Inventors: Robert H. Tang, Murrysville; Paritosh M. Chakrabarti, Pittsburgh, both of Pa.; Edward J. Rish, Charlotte, N.C.; William A. Williams, Latrobe, Pa.

[73] Assignee: PPG Industries, Inc., Pittsburgh, Pa.

[21] Appl. No.: 722,423

[22] Filed: Jun. 27, 1991

Related U.S. Application Data

[63] Continuation-in-part of Ser. No. 625,321, Dec. 10, 1990, abandoned, which is a continuation-in-part of Ser. No. 552,355, Jul. 12, 1990, abandoned, which is a continuation of Ser. No. 436,968, Nov. 15, 1989, abandoned, which is a continuation of Ser. No. 209,249, Jun. 20, 1988, abandoned.

[51] Int. Cl.$^5$ ............ C08F 16/12; C08F 16/30
[52] U.S. Cl. ................. 526/333; 526/287; 562/30; 568/606; 568/613; 568/617; 568/618
[58] Field of Search ............... 526/333, 287; 568/618

[56] References Cited

U.S. PATENT DOCUMENTS

| | | | |
|---|---|---|---|
| 2,677,700 | 5/1954 | Jackson | 568/618 |
| 2,996,538 | 8/1961 | Van Dijk et al. | 260/186 |
| 3,839,393 | 10/1974 | Steckler | 560/209 |
| 3,875,202 | 4/1975 | Steckler | 526/287 |
| 3,875,211 | 1/1975 | Steckler | 560/209 |
| 3,941,857 | 3/1976 | Wu | 260/837 |
| 4,049,608 | 9/1977 | Steckler | 260/29.6 |
| 4,222,957 | 9/1990 | Watts et al. | 260/512 |
| 4,224,455 | 9/1980 | Deutsch | 560/193 |
| 4,246,387 | 1/1981 | Deutsch | 526/209 |
| 4,337,185 | 6/1982 | Wessling et al. | 524/458 |
| 4,357,441 | 11/1982 | Hamamura et al. | 524/591 |
| 4,426,489 | 1/1984 | Wessling et al. | 524/815 |
| 4,467,073 | 8/1984 | Cressy | 525/127 |
| 4,582,137 | 4/1987 | Schmitt | 166/270 |
| 4,600,761 | 7/1986 | Ruffner | 526/270 |
| 4,797,223 | 1/1989 | Amick | 252/174.3 |
| 4,870,120 | 9/1989 | Tsubakimoto | 524/5 |
| 4,975,209 | 12/1990 | Welch | 252/8.6 |

Primary Examiner—Joseph L. Schofer
Assistant Examiner—Fred Zitomer
Attorney, Agent, or Firm—George D. Morris; Irwin M. Stein

[57] ABSTRACT

Describes alpha-beta ethylenically unsaturated poly(alkyleneoxy) compounds that display surfactant activity and that polymerize when used in the emulsion polymerization of ethylenically unsaturated monomers, including vinyl monomers. Certain of the polymer products are useful in imparting improved hand or feel to textile fabrics.

28 Claims, No Drawings

POLYMERIZABLE SURFACTANT

This application is a continuation-in-part of application Ser. No. 07/625,321, filed Dec. 10, 1990, which is a continuation-in-part of application Ser. No. 07/552,355, filed Jul. 12, 1990, which is a continuation of application Ser. No. 07/436,968, filed Nov. 15, 1989, now abandoned, which is a continuation of application Ser. No. 07/209,249, filed Jun. 30, 1988, all now abandoned.

DESCRIPTION OF THE INVENTION

In the emulsion (suspension) polymerization of ethylenically unsaturated monomers, one or more surfactants (or emulsifiers) are employed conventionally to emulsify the monomer reactant(s) and the resulting polymer product latex. Such surfactants do not become chemically bonded to the polymer product molecule by carbon to carbon bonding (as distinct from a physical mixture, being absorbed on the polymer product or the like). It has been suggested that the small amount of surfactant which remains in the polymer product latex may interfere with performance of products, e.g., coatings and adhesives, prepared from such latex. U.S. Pat. No. 3,941,857 reports that coatings prepared from vinyl chloride/olefin copolymers show inconsistent performance in hot water resistance and tend to be sensitive to water in that pitting or "blushing" (a whitening effect) may sporadically occur, particularly after exposure of the coating to boiling water for extended periods. Such a performance characteristic is detrimental to certain end uses for such copolymers, e.g., container and paper coatings, interior and exterior coatings, industrial coatings, automotive coatings and certain adhesives.

Various proposals have been made for avoiding the reported adverse effects of surfactant residues in emulsion polymerized polymers. U.S. Pat. No. 3,941,857 describes incorporating a small amount of an epoxy resin with a vinyl chloride/olefin copolymer resin before casting a film from the resin. U.S. Pat. No. 4,049,608 describes the use of esters of an alkenoic acid selected from the group consisting of cinnamic acid and alkenoic acids of from 4 to 18 carbon atoms with a hydroxyalkane sulfonic acid in the emulsion polymerization of vinyl and other ethylenically unsaturated monomers. These esters serve the dual function of emulsifier and co-monomer. U.S. Pat. No. 4,224,455 describes a class of ringed sulfonated half esters of maleic anhydride and alkoxylated alkyl arylols. These esters are reported to be anionic emulsifiers (surfactants) and reactive functional monomers that are co-polymerizable under emulsion polymerization conditions. U.S. Pat. No. 4,337,185 describes use of a reactive polymeric surfactant which is a substantially linear synthetic water-soluble surfactant whose polymeric backbone is derived from the polymerization of one or more ethylenically unsaturated monomers and which polymeric surfactant has a number average molecular weight of from about 500 to about 40,000 and contains various functional groups.

The present invention provides a novel group of alpha-beta ethylenically unsaturated poly(alkyleneoxy) compounds that display surfactant activity, i.e., they function as surfactants (emulsifiers) in emulsion (suspension) polymerization processes. Moreover, they are copolymerizable with ethylenically unsaturated monomers, including vinyl monomers, of the type commonly employed in emulsion polymerization processes by virtue of the reactive double bond present in the compounds. In accordance with the present invention, there is provided a novel group of compounds having a hydrophobic portion containing alpha-beta ethylenic unsaturation, and a hydrophilic portion containing a poly(alkyleneoxy) segment and an ionic (anionic, nonionic, or cationic) segment.

DETAILED DESCRIPTION OF THE INVENTION

The polymerizable surfactant compounds of the present invention may be represented by the following graphic formula:

$$R-O-(R'O)_m-(EO)_{n-1}-CH_2CH_2-X \qquad (I)$$

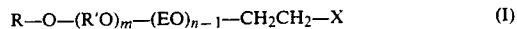

wherein R is an organic monovalent radical having alpha-beta olefinic (ethylenic) unsaturation, i.e., terminal ethylenic unsaturation. More particularly, R is an organic radical selected from the group consisting of alpha-beta unsaturated $C_2$-$C_{18}$ alkenyl, e.g., vinyl and allyl, acrylyl, acrylyl ($C_1$-$C_{10}$) alkyl, methacrylyl, methacrylyl ($C_1$-$C_{10}$) alkyl, vinylphenyl and vinylphenylene ($C_1$-$C_6$) alkyl. More particularly, the alpha-beta unsaturated $C_2$-$C_{18}$ alkenyl group may be represented by the following graphic formula:

$$CH_2=CH-C_aH_{2a}- \qquad (II)$$

wherein a is a number between 0 and 16. When a is 0, the alkenyl group is vinyl, i.e., $CH_2=CH-$. When a is 1, the alkenyl group is allyl, i.e., $CH_2=CH-CH_2-$.

The acrylyl, acrylyl ($C_1$-$C_{10}$) alkyl, methacrylyl and methacrylyl ($C_1$-$C_{10}$) alkyl groups may be represented by the following graphic formula:

$$\underset{\underset{CH_2=C-C-C_bH_{2b}-}{\overset{R_1}{|}\phantom{C-}\overset{O}{\|}}}{} \qquad (III)$$

wherein $R_1$ is hydrogen or methyl and b is a number from 0 to 10. When b is 0 and $R_1$ is hydrogen, the group is acrylyl $[CH_2=CH-C(O)-]$. When b is 0 and $R_1$ is methyl, the group is methacrylyl $[CH_2=C(CH_3)-C(O)-]$. When $R_1$ is hydrogen and b is 1, the group is acrylyl methyl $[CH_2=CH-C(O)-CH_2-]$.

The vinylphenylene and vinylphenylene ($C_1$-$C_6$) alkyl groups may be represented by the following graphic formula:

$$CH_2=CH-Ar-C_dH_{2d}- \qquad (IV)$$

wherein Ar is phenylene and d is a number between 0 and 6. When d is 0, the group is vinylphenyl and when d is 1, the group is vinylphenylene methyl.

In graphic formula I, —R'O— is a bivalent alkyleneoxy (substituted and unsubstituted) group derived from a cyclic ether other than ethylene oxide or mixture of such cyclic ethers. More particularly, —R'O— may be represented by the graphic formula —$CH_2CH(R''$)—O—, wherein R" is methyl, ethyl, phenyl, or phenyloxymethyl, —$CH_2$—$(CH_2)_2$—$CH_2$—O—, and mixtures thereof. Still more particularly, —R'O— may be described as the bivalent radical derived from cyclic ethers selected from the group consisting of propylene oxide, (e.g., 1,2-epoxypropane), butylene oxide (e.g., 1,2-epoxybutane), styrene oxide [(epoxyethyl)benzene], tetrahydrofuran, phenyl glycidyl ether (1,2-epoxy-3- phenoxypropane) and mixtures thereof. Preferably, —R'O— is the bivalent epoxy group derived from propylene oxide, butylene oxide and mixtures of propylene oxide and butylene oxide. When mixtures of butylene oxide and propylene oxide are used, it is preferred that the mixture comprise greater than 50 mole percent butylene oxide, e.g., greater than about 75 to 80 mole percent butylene oxide. The letter E in graphic formula I is the bivalent ethylene radical, and m and n are each numbers which may vary from about 5 to about 100, preferably between about 5 or 10 and about 50.

The ratio of m:n may vary from about 20:1 to about 1:20. The specific ratio of m:n used will depend on the particular polymerization system in which the polymerizable surfactant of the present invention is incorporated. Varying the ratio of m:n will vary the HLB (Hydrophilic-Lipophilic Balance) of the polymerizable surfactant compound. If the polymerization system requires a hydrophobic surfactant, m will be greater than n. Conversely, if the emulsion polymerization system requires a hydrophilic surfactant, then m will be less than n. The ratio of m:n should be chosen so that the resulting compound is capable of reducing the surface tension of water. Preferably, the surface tension of a 0.1 weight percent aqueous solution of the polymerizable surfactant compound at 25° C. is less than 38 dynes per centimeter. More preferably, the surface tension of such a solution is in the range of 30 to 35 dynes per centimeter. Surface tension may be measured by a Du Nouy tensiometer.

X in graphic formula I is selected from the group consisting of hydroxyl (—OH), chloride (—Cl), sulfonate (—$SO_3$), sulfate (—$OSO_3$), phosphate [—O—P(O)($OH)_2$], diphosphate [—O—P(O)($OH)_2$]$_2$, acetate (—$CH_2$—C(O)OH), isethionate (—$CH_2$—$CH_2$—$SO_3H$), and the alkali metal salts of the aforedescribed sulfonate, sulfate, phosphate, acetate and isethionate anionic groups, tertiary amino, i.e., —N($R_2$)($R_3$)$R_4$, wherein $R_2$, $R_3$ and $R_4$ are each selected from the group consisting of alkyl and hydroxyalkyl groups, particularly groups containing from 1 to 5 carbon atoms, e.g., a tertiary amine derived from trimethylamine, triethylamine, triethanolamine and diethylmethylamine. Commonly, X will be selected from the group consisting of sulfonate, sulfate, phosphate, acetate (and alkali metal salts thereof), hydroxyl, chloride and tertiaryamino. As used herein, the term "alkali metal" includes sodium, potassium, lithium and ammonium.

The polymerizable surfactant of the present invention may be prepared by reacting the precursor alcohol, ROH, wherein R is as heretofore defined with respect to graphic formula I, with the desired amount of first cyclic ether (R'O), e.g., propylene oxide, butylene oxide or mixtures thereof, and subsequently reacting the resulting epoxy-containing product with the desired amounts of ethylene oxide (EO). The product resulting from this reaction sequence is a material corresponding to graphic formula I wherein X is hydroxyl. Such a material may be used as a non-ionic surfactant.

Preparation of the polymerizable surfactant wherein X is sulfate may be accomplished by reacting the corresponding non-ionic (hydroxy end-capped) surfactant with chlorosulfonic acid, 100% sulfuric acid or with sulfur trioxide. See, for example, U.S. Pat. Nos. 2,143,759 and 2,106,716 of H. A. Bruson. Neutralization of the reaction product with an alkaline reagent, e.g., an alkali metal hydroxide such as sodium hydroxide, yields the corresponding salt, e.g., the sodium salt. Similarly, the corresponding non-ionic surfactant may be reacted with polyphosphoric acid ($P_2O_5.2H_2$) or chloroacetic acid by known procedures to prepare the phosphate or acetate end-capped polymerizable surfactant.

Sulfonate terminated polymerizable surfactants of graphic formula I may be prepared by first converting the corresponding non-ionic material to the corresponding chloride by reaction with thionyl chloride or carbonyl chloride (followed by subsequent decarboxylation to the chloride) and then reacting the chloride derivative with sodium sulfite. In conducting the sulfonation reaction, the pre-formed sulfonate terminated surfactant product may be used as the reaction medium to improve conversions. Thus, from 0 to 20 weight percent (based on the total amount of reactants) of pre-formed sulfonate product may be added to the reactor.

The chloride capped surfactant may be used itself as a surfactant as well as a precursor for preparing the sulfonate, isethionate or quaternary ammonium terminated surfactant. The isethionate derivative may be prepared by reacting the chloride-capped surfactant with isethionic acid in the presence of a base, e.g., sodium hydroxide. Quaternary ammonium derivatives may be prepared by reacting the corresponding chloride with the tertiary amine, N($R_2$)($R_3$)$R_4$, wherein $R_2$, $R_3$ and $R_4$ are the same as defined with respect to X in graphic formula I. Processes for converting the non-ionic polymerizable surfactant to the chloride, sulfate, sulfonate, phosphate ester, acetate, isethionate or quaternary ammonium derivative are well known to the skilled chemist.

The precursor alpha-beta ethylenically unsaturated alcohols used to prepare the polymerizable surfactant materials of graphic formula I may be prepared by methods known in the art. Some, such as allyl alcohol, are readily commercially available. In accordance with a particular embodiment of the present invention, the precursor alcohol is charged to a suitable autoclave and heated to a temperature in the range of from about 110° C. to about 130° C. Propylene oxide and/or 1,2-epoxybutane are metered into the autoclave and reacted with the unsaturated alcohol in the presence of an alkaline reagent such as sodium hydroxide. After the desired amount of propoxylation and/or butoxylation is achieved, ethylene oxide is substituted for the propylene oxide and/or 1,2-epoxybutane reactant(s) and metered into the reactor until the desired level of ethoxylation is achieved. Pressures in the reactor will usually remain at less than 100 pounds per square inch gauge during these reactions. The resulting poly(alkyleneoxy) material is removed from the reactor, the alkaline reagent neutralized with acid, and the product recovered by filtration. This non-ionic material may be converted to the sulfate, sulfonate, phosphate ester, acetate, or isethionate (or their salts), or the chloride or quaternary ammonium derivative by the methods heretofore described.

The number of epoxy, e.g., alkyleneoxy, groups present in the polymerizable surfactant material will vary as described with respect to graphic formula I. The number of epoxy units present per mole of surfactant of graphic formula I, i.e., the letters "m" and "n", is the average number of moles of alkyleneoxy groups present per mole of surfactant and hence the value of m and n may be a fractional number between 5 and 100.

Polymerizable surfactant materials of the present invention may be used in emulsion (or suspension) or solution polymerizations. Such polymerizations may be carried out by free radical initiated polymerization using batch, continuous, or controlled monomer feed processes, known conditions of stirring time and temperature, and known kinds of additives such as initiators, surfactants, electrolytes, pH adjusting agents, buffering agents and the like. In general, the emulsion or solution polymerization will be carried out from about 20° C. to about 120° C., e.g., between about 50° C. and about 80° C. Batch polymerization times may vary depending on the method of polymerization and the monomers being polymerized. Such times may vary from about 2 to about 10 hours. The polymerizable surfactant materials of the present invention are particularly useful in emulsion polymerization processes of the liquid phase type wherein water comprises the continuous phase and the monomer(s) is present substantially as a dispersed phase at the initiation of polymerization. The polymerization medium has incorporated therein at a minimum a sufficient amount of the polymerizable surfactant of the present invention to produce a stable, small particle size, dispersed monomer emulsion or suspension. The polymerizable surfactant of the present invention may be added batchwise, semicontinuously or continuously to the polymerizable reaction mixture.

The quantity of polymerizable surfactant used in the polymerization of ethylenically unsaturated monomers, particularly when used as the sole emulsion polymerization surfactant, may range from about 1.0 to about 10 weight percent based on the total reactant monomer content employed in the given emulsion polymerization system. Preferably the amount of such polymerizable surfactant material employed ranges from about 3.0 to about 6 weight percent, similarly based on total monomer.

The polymerizable surfactant materials of the present invention may be used in an emulsion polymerization reaction in combination with conventional emulsion polymerization surfactants that are not reactive, i.e., non-copolymerizable with the polymerizable monomers. In selecting cosurfactant materials to be used, anionic and cationic materials should not be used together. Anionic and non-ionic surfactant materials or cationic and non-ionic surfactant materials may be used in combination. The reactive surfactants of the present invention themselves characteristically display excellent capacity for producing emulsion stability characteristics in the emulsion polymerization. It is contemplated that such conventional surfactants will be used in amounts of from 3 to 6 weight percent, based on the total amount of monomer(s).

In another embodiment of the present invention, it is contemplated that polymerizable surfactants of the present invention may be used as comonomers with the ethylenically unsaturated monomer(s) to modify the physical properties of the resulting polymer. The amount of polymerizable surfactant that may be so used may vary, e.g., from about 1 to about 25 weight percent, but will commonly be in the range of from about 1 to about 10, e.g., 3 to 6, weight percent, based on the total reactant monomer content. In this embodiment, conventional emulsion polymerization surfactants also may be used as additives to the polymerization, e.g., in amounts of from about 3 to 6 weight percent, based on the total amount of monomeric reactants to be polymerized.

In a further embodiment of the present invention, ethylenically unsaturated monomer(s) and from 1-25 weight percent (as described hereinbefore) of the polymerizable reactive compounds represented by graphic formula I are copolymerized by solution polymerization. Any conventional organic solvent, which may be a solvent for both the monomer(s) and polymer, or just the monomer(s) may be used. Organic or inorganic free-radical initiators, as described herein, may be used to initiate the solution polymerization.

A sufficient quantity of a polymerization initiator (such as a conventional free radical initiator) is introduced into the polymerization medium to cause polymerization of the monomer(s) at the particular temperatures employed. Initiators used in emulsion polymerization processes are of the type which produce free radicals and conveniently are peroxygen compounds, for example: inorganic peroxides such as hydrogen peroxide and inorganic persulfate compounds such as ammonium persulfate, sodium persulfate and potassium persulfate; organic hydroperoxides such as cumene hydroperoxide and tertiary butyl hydroperoxide; organic peroxides such as benzoly peroxide, acetyl peroxide, lauroyl peroxide, peroxydicarbonate esters such as diisopropyl peroxydicarbonate, peracetic acid and perbenzoic acid—sometimes activated by water-soluble reducing agents such as ferrous compound, sodium bisulfite or hydroxylamine hydrochloride—and other free radical producing materials such as 2,2'-azobisisobutyronitrile.

Conventional cationic nonpolymerizable surfactants include the classes of salts of aliphatic amines, especially the fatty amines, quaternary ammonium salts and hydrates, fatty amides derived from disubstituted diamines, fatty chain derivatives of pyridinium compounds, ethylene oxide condensation products of fatty amines, sulfonium compounds, isothiouronium compounds and phosphonium compounds. Specific examples of the cationic surfactants are dodecylamine acetate, dodecyl-amine hydrochloride, tetradecylamine hydrochloride, hexadecylamine acetate, lauryl dimethylamine citrate, octadecylamine sulfate, dodecyl-amine lactate, cetyl trimethyl ammonium bromide, cetyl pyridinium chloride, an ethanolated alkyl guanidine amine complex, stearyl dimethyl benzyl ammonium chloride, cetyl dimethyl amine oxide, cetyl dimethyl benzyl ammonium chloride, tetradecylpyridinium bromide, diisobutyl phenoxy ethoxy ethyl dimethyl benzyl ammonium chloride, 1-(2-hydroxy-ethyl)-2-(mixed pentadecyl and heptadecyl)-2-imidazoline, resin amine ethoxylate, oleyl imidazoline, octadecyl ethylmethyl sulfonium methyl sulfate, dodecyl-bis-$\beta$-hydroxyethylsulfonium acetate, dodecylbenzyldimethylsulfonium chloride, dodecylbenzyltrimethylphosphonium chloride and S-p-dodecylbenzyl-N-N-N'-N'-tetramethylisothioronium chloride.

Representative types of anionic emulsifiers are the alkyl aryl sulfonates, the alkali metal alkyl sulfates, the sulfonated alkyl esters, the fatty acid soaps and the like. Specific examples of these well known emulsifiers are dodecylbenzene sodium sulfonate, sodium butyl naphthalene sulfonate, sodium lauryl sulfate disodium dodecyldiphenyl ether disulfonate, n-octadecyl disodium sulfosuccinate and dioctyl sodium sulfosuccinate.

Typical nonionic emulsifiers (surfactants) are compounds formed by the reaction of an alkylene oxide, such as ethylene oxide, propylene oxide or butylene oxide, with long chain fatty alcohols, long chain fatty acids, alkylated phenols, long chain alkyl mercaptans, long chain alkyl primary amines, for example, cetylamine, the alkylene oxides being reacted in a ratio of from about 5 moles to 20 moles or higher, e.g., up to 50 moles, per mole of the coreactant. Other representative compounds are monoesters, e.g., the reaction products of a polyethylene glycol with a long chain fatty acid, glycerol monostearate, sorbitan trioleate and partial and complete esters of long chain carboxylate acids with polyglycol ethers of polyhydric alcohols. By "long chain" in the above description is meant an aliphatic group having from six carbon atoms to 20 carbon atoms or more.

A further additive that may be introduced into the polymerization reaction media is a conventional chain transfer agent such as an alkyl polyhalide or mercaptan. Examples include: bromoform, carbon tetrachloride, carbon tetrabromide, bromoethane, alkyl mercaptans of 1 to 12 carbon atoms, e.g., dodecylmercaptan, thiophenol and hydroxyalkyl mercaptans, e.g., mercaptoethanol.

Ethylenically unsaturated monomer(s) which may be copolymerized with an ethylenically unsaturated, polymerizable material of graphic formula I are well known in the art and are illustrated herein only by representative example. Ethylenically unsaturated monomers are represented by, but not restricted to, mono- and polyunsaturated hydrocarbon monomers, vinyl ethers, e.g., vinyl esters of $C_1$–$C_6$ saturated monocarboxylic acids, vinyl ethers, monoethylenically unsaturated mono- and polycarboxylic acids and their alkyl esters, e.g., acrylic acid esters and methacrylic acid esters, (particularly their $C_1$–$C_{12}$ alkyl, more particularly their $C_1$–$C_4$ alkyl, esters), the nitriles, vinyl and vinylidene halides, amides of unsaturated carboxylic acids and amino monomers.

Representative examples of hydrocarbon monomers include compounds such as the styrene compounds, e.g., styrene, carboxylated styrene, and alpha-methyl styrene, and conjugated dienes, for example, butadiene, isoprene and copolymers of butadiene and isoprene. Representative examples of vinyl and vinylidene halides include: vinyl chloride, vinylidene chloride, vinyl fluoride and vinylidene fluoride.

Acrylic ester and methacrylic ester examples include $C_1$–$C_{12}$, e.g., $C_1$–$C_4$, alkyl acrylates and methacrylates. Typical acrylic esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, hexyl acrylate, 2-ethylhexyl acrylate, 2-ethylhexyl methacrylate, t-butyl acrylate, t-butyl methacrylate, 3,3-dimethylbutyl acrylate, 3,3-dimethyl butyl methacrylate, and lauryl acrylate.

Suitable vinyl esters include aliphatic vinyl esters, such as vinyl formate, vinyl acetate, vinyl proprionate, vinyl butyrate, vinyl isobutyrate, vinyl valerate, and vinyl caproate, and allyl esters of saturated monocarboxylic acids, such as allyl acetate, allyl propionate and allyl lactate.

Typical vinyl ethers include methylvinyl ether, ethylvinyl ether and n-butylvinyl ether. Typical vinyl ketones include methylvinyl ketone, ethylvinyl ketone and isobutylvinyl ketone. Suitable dialkyl esters of monoethylenically unsaturated dicarboxylic acids include dimethyl maleate, diethyl maleate, dibutyl maleate, dioctyl maleate, diisooctyl maleate dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate and dioctyl itaconate.

Suitable monoethylenically unsaturated monocarboxylic acids include acrylic acid, methacrylic acid, ethacrylic acid and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives, e.g., alpha-chloroacrylic acid, and anhydrides of these acids, such as, e.g., maleic anhydride and citraconic anhydride are suitable for use as monomers.

Acrylonitrile, alpha-chloro-acrylonitrile and methacrylonitrile are among the corresponding nitriles of such acids which can be used as monomers. Suitable amides of such acids include unsubstituted amides such as acrylamide, methacrylamide and other alpha-substituted acrylamides and N-substituted amides obtained by conventional reaction of the amides of the aforementioned mono- and poly-carboxylic acids with an aldehyde, such as formaldehyde. Typical N-substituted amides include N-methylolacrylamide, N-methylolmethacrylamide, alkylated N-methylolacrylamides and N-methylolmethacrylamides, such as N-methoxymethylacrylamide and N-methoxymethylmethacrylamide.

Typical amino monomers include substituted and unsubstituted aminoalkyl acrylates, hydrochloride salts of amino monomers and methacrylates, such as beta-aminoethylacrylate, beta-amino- ethylmethacrylate, dimethylamino-methylacrylate, beta-methylaminoethylacrylate, and dimethylaminomethylmethacrylate.

Hydroxy-containing monomers include beta-hydroxyethylacrylate, beta-hydroxypropylacrylate, gamma-hydroxypropylacrylate and beta-hydroxy-ethylmethacrylate.

The aforesaid monomers, particularly the acrylic esters and methacrylic esters, may be homopolymerized or copolymerized with other of the described monomers, i.e., one or more different monomers capable of addition type polymerization.

The reactive surfactants of the present invention may find particular use in polymerization systems including various monomer and monomer mixtures to form homopolymers and copolymers, such as vinylacetate-acrylic monomer mixtures, vinyl acetate monomer, ethylene-vinyl acetate monomer mixtures, styrene, styrene-acrylic monomer mixtures, butadiene-acrylonitrile monomer mixtures, styrene-butadiene monomer mixtures, vinyl chloride, vinylidene chloride, vinyl fluoride, vinylidene fluorine, and mixtures of other monomers with each of said vinyl and vinylidene halides, acrylic monomer-acrylonitrile monomer mixtures, and all acrylic monomer mixtures. The term "acrylic" as used herein is intended to mean and include one or more acrylic esters and/or methacrylic esters with and without acrylic acid or methacrylic acid. Such monomer mixtures are well known to the skilled artisan.

The polymerizable surfactants of the present invention polymerize along with the conventional reactant monomer(s) in the polymerization process, thereby to form water-insoluble, substantially surfactant-free polymer particles. Thus, the polymer latex product is not contaminated with an undesirable residue of water-soluble surfactant. The polymer product has improved resistance to water and may be used in any end use application for which the particular polymer product produced from the conventional reactant monomer(s) may be used. Examples include interior and exterior coatings, e.g., latex paints, container, paper and paperboard coatings, e.g., can coatings, adhesives, such as waterborne adhesives and pressure sensitive adhesives, sealants, industrial coatings, automotive coatings, textile coatings and binders, floor finishes, water-based inks, films, and binders for non-woven materials such as carpet backing.

The polymer product prepared with the polymerizable surfactants of the present invention may be used as the principle resin component or as a minor component of a resin mixture used to prepare the coatings, adhesives, sealants, binders, inks, floor finishes, etc. described herein. The remainder of the film forming composition may comprise various fillers, e.g., pigments, colorants, etc., solvents, e.g., aqueous or organic solvents, plasticizers, antioxidants, curing agents, thickeners, surfactants, preservatives, wet strength additives, and other adjuvant materials added in conventional amounts to resin compositions used in the aforedescribed end-use applications.

It has also been discovered that certain classes of polymers within the invention are particularly well suited for reducing the shrinkage of cotton fabrics, cotton/polyester blend fabrics, cotton/rayon blend fabrics, rayon fabrics, and cellulosic or cellulosic/synthetic blend fabrics.

Accordingly, one embodiment of the invention is a polymer product that is prepared by the polymerization of ethylenically unsaturated reactant monomers consisting essentially of from about 90 to about 99 percent by weight alkyl acrylate weherein the alkyl group contains from 1 to about 4 carbon atoms, from about 0.5 to about 5 percent by weight of acrylic acid, and from about 0.5 to about 5 percent by weight of N-methylolacrylamide in the presence of from about 1 to about 5 weight percent, based on the total amount of reactant monomer, of a compound represented by the graphic formula:

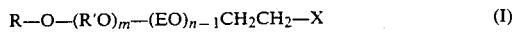

$$R-O-(R'O)_m-(EO)_{n-1}CH_2CH_2-X \quad (I)$$

wherein R is selected from the group consisting of alpha-beta unsaturated $C_2-C_{18}$ alkylenyl, e.g., vinyl and allyl, acrylyl, acrylyl($C_1-C_{10}$)alkyl, methacrylyl, methacrylyl($C_1-C_{10}$)alkyl, vinylphenyl, and vinylphenylene($C_1-C_6$)alkyl, R'O is selected from the group consisting of bivalent radicals derived from the cyclic ethers propylene oxide, butylene oxide, styrene oxide, tetrahydrofuran, and phenyl glycidyl ether, and mixtures of such bivalent radicals, E is the bivalent ethylene radical, m and n are each numbers of from about 5 to about 50, the ratio of m:n being from about 20:1 to about 1:20, and X is selected from the group consisting of hydroxyl, chloride, and the anionic groups sulfonate, sulfate, phosphate, acetate, isethionate (and alkali metal salts of such anionic groups).

Graphic formula I given above is presented earlier in this specification. The earlier discussions in respect of R, R', E, m, and n are also applicable to this embodiment. The earlier discussion in respect of X insofar as X is a nonionic group or an anionic group is also applicable to this embodiment.

The alkyl acrylate wherein the alkyl group contains from 1 to about 4 carbon atoms may be a single alkyl acrylate or it may be a mixture of two or more such alkyl acrylates. The alkyl groups may be straight or branched, but preferably they are straight. Exemplary alkyl acrylates include methyl acrylate, ethyl acrylate, propyl acrylate, isopropyl acrylate, butyl acrylate, isobutyl acrylate, sec-butyl acrylate, and tert-butyl acrylate. The preferred alkyl acrylates are ethyl acrylate, butyl acrylate and mixtures of ethyl crylate and butyl acrylate.

The alkyl acrylate wherein the alkyl group contains from 1 to about 4 carbon atoms constitutes from about 90 to about 99 percent by weight of the ethylenically unsaturated reactant monomers. Preferably such alkyl acrylate constitutes from about 94 to about 98 percent by weight of the ethylenically unsaturated reactant monomers.

Acrylic acid constitutes from about 0.5 to about 5 percent by weight of the ethylenically unsaturated reactant monomers. Preferably acrylic acid constitutes from about 1 to about 3 percent by weight of the ethylenically unsaturated reactant monomers.

N-Methylolacrylamide constitutes from about 0.5 to about 5 percent by weight of the ethylenically unsaturated reactant monomers. Preferably N-Methylolacrylamide constitutes from about 1 to about 3 percent by weight of the ethylenically unsaturated reactant monomers.

In the embodiment relating to reducing the shrinkage of fabrics, the polymerization is conducted in the presence of from about 1 to about 5 weight percent, based on the total amount of reactant monomer, of the compound represented by graphic formula I. Preferably the polymerization is conducted in the presence of from about 1.5 to about 3 weight percent, based on the total amount of reactant monomer, of the compound represented by graphic formula I.

The polymerization may be a solution polymerization, an emulsion polymerization, or a suspension polymerization, as earlier discussed. The polymerization may be conducted in any manner known to the art, including but not limited to free-radical polymerizations and redox polymerizations.

The polymer of this embodiment is especially effective in reducing the shrinkage of cotton fabrics, cotton/polyester blend fabrics, cotton/rayon blend fabrics, rayon fabrics, and cellulosic or cellulosic/synthetic blend fabrics. A composition comprising the polymer and volatile liquid carrier may conveniently be applied to the fabric in the form of a solution, an emulsion (including a latex), or a suspension. The concentration of the polymer in the composition may vary widely, but usually the polymer constitutes from about 5 to about 30 weight percent of the composition. Preferably the polymer constitutes from about 10 to about 20 weight percent of the composition.

The composition may be applied to the fabric by any method known to the art, as for example by spraying, padding, dipping, or coating. After application, the volatile liquid carrier is removed by some form of evaporation such as drying.

From what has been said, it is evident that yet another embodiment of the invention is textile fabric selected from the group consisting of cotton fabric, cotton/polyester blend fabric, cotton/rayon blend fabric, rayon fabric, and cellulosic or cellulosic/synthetic blend fabric, wherein the textile fabric comprises the polymer product that is prepared by the free-radical initiated polymerization of ethylenically unsaturated reactant monomers consisting essentially of from about 90 to about 99 percent by weight alkyl acrylate wherein the alkyl group contains from 1 to about 4 carbon atoms, from about 0.5 to about 5 percent by weight of acrylic acid, and from about 0.5 to about 5 percent by weight of N-methylolacrylamide in the presence of from about 1 to about 5 weight percent, based on the total amount of reactant monomer, of a compound represented by the graphic formula:

$$R-O-(R'O)_m-(EO)_{n-1}CH_2CH_2-X, \quad (I)$$

wherein (as described hereinabove) R is selected from the group consisting of vinyl, allyl, acrylyl, acrylyl($C_1$-$C_{10}$)alkyl, methacrylyl, methacrylyl($C_1$-$C_{10}$)alkyl, vinylphenyl, and vinylphenylene($C_1$-$C_6$)alkyl, R'O is selected from the group consisting of bivalent radicals derived from the cyclic ethers propylene oxide, butylene oxide, styrene oxide, tetrahydrofuran, and phenyl glycidyl ether, and mixtures of such bivalent radicals, E is the bivalent ethylene radical, m and n are each numbers of from about 5 to about 50, the ratio of m:n being from about 20:1 to about 1:20, and X is selected from the group consisting of hydroxyl, chloride, and the anionic groups sulfonate, sulfate, phosphate, acetate, isethionate (and alkali metal salts of such anionic groups).

The textile fabric may be woven, knitted, or nonwoven.

The polymer product content of the textile fabric may vary very widely. In most cases the polymer product constitutes from about 3 to about 15 percent by weight of the textile fabric. Often the polymer product constitutes from about 5 to about 13 percent by weight of the textile fabric. From about 7 to about 11 percent by weight is preferred.

It has further been discovered that certain classes of polymers within the invention are particularly well suited for not only improving the hand or feel, but also improving the resistance to wash down and laundering, of fabrics such as cotton fabrics, cotton/polyester blend fabrics, cotton/rayon blend fabrics, rayon fabrics, and cellulosic or cellulosic/synthetic blend fabrics. As used herein, the terms "hand" or "feel" refer to the tactile impression one receives when touching, squeezing, rubbing or otherwise handling a fabric and includes such qualities as stiffness or limpness, softness or hardness, and smoothness or roughness.

According to this embodiment of the invention, the polymer product is prepared by the polymerization of a reactant monomer or monomer mixture selected from vinyl ester monomer, vinylacetate-acrylic monomer mixtures, ethylene-vinyl acetate monomer mixtures, styrene, styrene-acrylic monomer mixtures, butadiene-acrylonitrile monomer mixtures, vinyl chloride, vinylidene chloride, vinyl fluoride, vinylidene fluorine, or acrylic monomer mixture. The term "acrylic" as used in this context is intended to mean and include one or more $C_1$-$C_{12}$, e.g., $C_1$-$C_4$, alkyl esters of acrylic or methacrylic acid. Suitable vinyl esters include aliphatic vinyl esters, such as vinyl formate, vinyl acetate, vinyl proprionate, vinyl butyrate, vinyl isobutyrate, vinyl valerate, and vinyl caproate as well as allyl esters of saturated $C_1$ to $C_6$ monocarboxylic acids, such as allyl acetate, allyl propionate and allyl lactate. Vinyl ester mixtures may also be used.

The said polymer product is prepared by polymerizing the said monomer or mixtures in the presence of a compound represented by the graphic formula:

$$R-O-(R'O)_m-(EO)_{n-1}CH_2CH_2-X, \quad (I)$$

wherein (as described hereinabove) R is selected from the group consisting of $C_2$-$C_{18}$ alkylenyl having terminal ethylenic unsaturation, e.g., vinyl and allyl, acrylyl, acrylyl($C_1$-$C_{10}$)alkyl, methacrylyl, methacrylyl($C_1$-$C_{10}$)alkyl, vinylphenyl, and vinylphenylene($C_1$-$C_6$)alkyl, R'O is selected from the group consisting of bivalent radicals derived from the cyclic ethers propylene oxide, butylene oxide, styrene oxide, tetrahydrofuran, and phenyl glycidyl ether, and mixtures of such bivalent radicals, E is the bivalent ethylene radical, m and n are each numbers of from about 5 to about 50, the ratio of m:n being from about 20:1 to about 1:20, and X is selected from the group consisting of hydroxyl, chloride, and the anionic groups sulfonate, sulfate, phosphate, acetate, isethionate (and alkali metal salts of such anionic groups).

Graphic formula I given above is presented earlier in this specification. The earlier discussions in respect of R, R', E, m, and n are also applicable to this embodiment. The earlier discussion in respect of X insofar as X is a nonionic group or an anionic group is also applicable to this embodiment.

According to this embodiment of the invention, the reactant monomer is preferably vinyl acetate or allyl acetate and, in graphic formula 1B, R is preferably allyl or vinyl, R'O is the bivalent bivalent radical derived from butylene oxide, propylene oxide or mixtures of butylene oxide and propylene oxide wherein butylene oxide comprises greater than 50, e.g., 75 or 80, mole percent of the mixture.

The polymerization may be conducted in the presence of from about 1 to about 25 weight percent, based on the total amount of reactant monomer, of the compound represented by graphic formula I. More typically, the polymerization is conducted in the presence of from about 1 to about 10 weight percent, e.g., from about 3 to about 6 weight percent, based on the total amount of reactant monomer, of the compound represented by graphic formula I.

The polymerization may be a solution polymerization, an emulsion polymerization, or a suspension polymerization, as earlier discussed. The polymerization may be conducted in any manner known to the art, including but not limited to free-radical polymerization and redox polymerization.

As beforementioned, when applied to textile fabric, the polymer of this embodiment is especially effective in improving the hand or feel of the fabric. The polymer is applied to the fabric in the form of a composition comprising the polymer and volatile liquid carrier, e.g., water, which composition may be a solution, an emulsion (including a latex), or a suspension of the polymer in the liquid carrier. The concentration of the polymer in the composition may vary widely, but usually the polymer constitutes from about 5 to about 30 weight percent of the composition. Preferably the polymer constitutes from about 10 to about 20 weight percent of the composition.

The composition may be applied to the fabric by any method known to the art, as for example by spraying, padding, dipping, or coating. After application, the volatile liquid carrier is removed by suitable evaporation, e.g., drying.

The polymer product content of the textile fabric may also vary. In most cases the polymer product constitutes from about 1 to about 10 percent and preferably from about 2 to about 5 percent, by weight of the textile fabric of dry polymer solids.

The present invention is more particularly described in the following examples, which are intended as illustrative only since numerous modifications and variations therein will be apparent to those skilled in the art.

EXAMPLE 1

A one liter magnetically stirred autoclave was charged with 58.1 grams of allyl alcohol and 0.92 grams of sodium hydroxide. The autoclave was sealed and the air atmosphere therein replaced with nitrogen. The autoclave was pressurized with nitrogen to 10 pounds per square inch gauge (psig) and the contents heated to 120° C. 1,2-epoxybutane was introduced slowly and continuously into the autoclave while the reactor contents were maintained between about 110° C. and 130° C. The maximum operating pressure during addition of the 1,2-epoxybutane was less than 100 psig. After 600 grams of 1,2-epoxybutane had been introduced into the autoclave, the reaction slowed. The contents of the autoclave were cooled to about 15° C., the autoclave opened and an additional 0.66 grams of sodium hydroxide introduced into the autoclave to enhance the rate of alkoxylation. The autoclave was closed, the air atmosphere replaced with nitrogen, the autoclave pressurized to a pressure of 10 psig with nitrogen and the contents heated to 120° C. 1,2-epoxybutane was again charged to the autoclave until the total amount of epoxybutane added reached about 865 grams. When the pressure in the autoclave reached a steady value, the autoclave was cooled. 886.4 grams of a light yellow-colored liquid product was recovered. The product was subjected to vacuum degassing to remove any residual unreacted 1,2-epoxybutane from the product. The degassed product was identified as the butoxylated product of allyl alcohol. Proton nuclear magnetic resonance (NMR) spectroscopy indicated that the number of butoxy groups in the product was about 12.3 per molecule.

A one liter magnetically stirred autoclave was charged with 332 grams of the above-described degassed butoxylated allyl alcohol. After replacing the air atmosphere in the autoclave with nitrogen, the butoxylated allyl alcohol was heated to 120° C. and 240 grams of ethylene oxide added slowly to the autoclave over a period of about 3 hours so as to maintain the reaction temperature at 120° C. and the operating pressure below 90 psig. The resultant product was allowed to cool to 30° C. and 0.89 grams of acetic acid added to the reaction product for neutralization of the basicity in the reaction mixture. The final product was a light yellow liquid. The number of ethoxy units per molecule in the product were determined by proton NMR to be about 15.3. This product will be referred to herein as Sample 1-A. A 0.1 weight percent aqueous solution of Sample 1-A was prepared and the surface tension of the solution measured at 25° C. with a Du Nouy tensiometer. The surface tension was found to be 31.6 dynes/centimeter.

The one liter autoclave was charged with 277 grams of the degassed butoxylated allyl alcohol and flushed with nitrogen for 30 minutes. The butoxylated allyl alcohol was heated to 120° C. and 330 grams of ethylene oxide charged slowly over about 3 hours to the autoclave while maintaining the reaction temperature at about 120° C. and the operating pressure below 90 psig. 0.74 grams of acetic acid were added to neutralize the basicity in the product. 614.7 grams of a light yellow liquid product was recovered. Proton-NMR indicated that the number of ethoxy groups per molecule in the product was about 26.1. This product will be referred to herein as Sample 1-B. The surface tension of a 0.1 weight percent aqueous solution of Sample 1-B product was 32.2 dynes/centimeter at 25° C.

The one liter autoclave was charged with 221 grams of the degassed butoxylated allyl alcohol, flushed with nitrogen, and the butoxylated allyl alcohol heated to 120° C. 370 grams of ethylene oxide were charged slowly to the autoclave over about 4 hours while maintaining the reaction temperature at about 120° C. and the reaction pressure at less than 100 psig. When all of the ethylene oxide had been charged to the autoclave, the pressure was permitted to equilibrate and the autoclave cooled. 0.59 grams of acetic acid were added to neutralize the basicity in the reaction product. Proton-NMR indicated that the number of ethoxy units in the light yellow liquid product was about 40.6 This product will be referred to herein as Sample 1-C. The surface tension of a 0.1 weight percent aqueous solution of the Sample 1-C product was 33.6 dynes/centimeter at 25° C.

EXAMPLE 2

A two liter, jacketed round-bottom flask equipped with a phosgene inlet tube, dry ice cooled condenser, stirrer and dropping funnel was charged with 20 grams of liquid phosgene. The reaction flask was then charged simultaneously with 477 grams of product Sample 1-B described in Example 1 and 40 grams of additional phosgene. The reaction mixture was stirred at 15°-20° C. for several hours before excess phosgene was removed by degassing the reaction product. The resulting chloroformate was converted to the corresponding chloride by heating it in the presence of 1.23 grams of trioctyl methyl ammonium chloride at 120°-140° C. for 4 hours. 480 grams of product were recovered. The product was confirmed as the corresponding chloride by proton-NMR and infrared spectroscopy, and total chloride analysis.

EXAMPLE 3

A 0.5 liter magnetically stirred autoclave was charged with 100.7 grams of the chloride product of Example 2, 12.3 grams of sodium sulfite (98 percent), 265.1 grams of deionized water and 1.2 grams of a 50 percent aqueous solution of sodium hydroxide. The autoclave was sealed and the contents heated to 155° C. and maintained at temperature overnight. The pressure within the autoclave stabilized at about 60 psig. The contents of the autoclave were cooled subsequently to less than 5° C. The product, i.e., the corresponding sulfonate of the chloride product of Example 2, was a light yellow liquid containing 28.3 percent solids with 7.2 percent (as is) anionic surfactant activity.

EXAMPLE 4

The procedure of Example 3 was repeated except that 77.4 grams of the pre-formed sulfonate product produced in Example 3 was added to the autoclave with the reactants. 423.7 grams of a light yellow clear liquid product was recovered from the autoclave. The product was treated with 1.00 grams of hydrogen peroxide (49.5 percent) for removal of residual sulfite anion. The product contained about 30 percent solids and analyzed about 14.6 percent anionic surfactant activity.

EXAMPLE 5

The procedure of Example 3 was repeated except that 113.2 grams of the pre-formed sulfonate product from Example 4 was added to the autoclave with the reactants. The product was a light yellow clear liquid. It was treated with 1.33 grams of hydrogen peroxide (49.5 percent) for removal of residual sulfite anion.

The sulfonate product was combined with the product of Example 4. The resultant mixture had a solids content of about 28.3 percent and analyzed about 16.2 percent anionic surfactant activity. The surface tension of a 0.1 weight percent aqueous solution of the product was found to be 35.6 dynes/centimeter at 25° C.

EXAMPLE 6

Using the procedure of Example 2, 401 grams of Sample 1-A were reacted with phosgene and the resulting chloroformate decarboxylated to the corresponding chloride with 1.1 grams of trioctyl methyl ammonium chloride. 77.7 grams of the resulting chloride product were converted to the sulfonate by the procedure of Example 3 utilizing 15.4 grams of sodium sulfite, 174.3 grams of deionized water and 1.54 grams of a 50 percent aqueous solution of sodium hydroxide. A milky light yellow liquid containing 33.3 percent solids with 9.6 percent anionic surfactant activity was obtained.

EXAMPLE 7

The sulfonation procedure of Example 3 was followed using 77.7 grams of the chloride product of Example 6, 15.4 grams of sodium sulfite, 1.54 grams of sodium hydroxide, 218.3 grams of deionized water and 135.9 grams of the pre-formed sulfonate product produced in Example 6. The product contained about 29.3 percent solids and analyzed about 10.8 percent anionic surfactant activity. After standing for about two weeks, the product was observed to have separated into two layers.

EXAMPLE 8

The procedure of Example 7 was repeated except that 149.8 grams of the top layer of the sulfonate product of Example 7 was used as the pre-formed sulfonate in the sulfonation reaction. The sulfonate product was treated with 1.33 grams of hydrogen peroxide (49.5 percent) to remove residual sulfite anion, and then combined with the remainder of the sulfonate product from Example 7. The combined product had 11.1% anionic surfactant activity and contained about 31.8 percent solids. The surface tension of a 0.1 weight percent aqueous solution of the product was found to be 35.9 dynes/centimeter at 25° C.

EXAMPLE 9

Following the procedure of Example 2, 407 grams of Sample 1-C were converted to the corresponding chloroformate with phosgene. The chloroformate was decarboxylated to the corresponding chloride with 1.05 grams of trioctyl methyl ammonium chloride. 115.6 grams of the resulting chloride product was converted to the corresponding sulfonate by the procedure of Example 3 utilizing 10.8 grams of sodium sulfite, 1.1 grams of a 50 percent aqueous solution of sodium hydroxide and 296.2 grams of deionized water. The product was a light yellow clear solution at 60° C. It was treated with 1.9 grams of hydrogen peroxide (49.5 percent) to remove any residual sulfite anion. The product contained 28.8 percent solids with 15.8 anionic surfactant activity.

EXAMPLE 10

The sulfonation procedure of Example 9 was repeated except that 57.1 grams of the pre-formed sulfonate product of Example 9 was added to the autoclave with the reactants. The product was a clear light yellow liquid which was treated with 1.76 grams of hydrogen peroxide to remove residual sulfite anion. The sulfonate product contained about 31.9 percent solids and analyzed 18.7 percent anionic surfactant activity.

The sulfonate product was combined with the remainder of the product from Example 9. The resulting product contained about 32.6 percent solids and analyzed about 16.1 percent anionic surfactant activity. The surface tension of a 0.1 weight percent aqueous solution of the product was found to be 35.1 dynes/centimeter at 25° C.

EXAMPLE 11

A vinyl acetate-butyl acrylate copolymer was prepared utilizing the sulfonate product of Example 5 as the sole surfactant. A one liter resin kettle was charged with a solution of 31.7 grams of the sulfonate product of Example 5 in 281 grams of deionized water. The solution was heated to 80° C. under a nitrogen atmosphere. One gram of potassium persulfate ($K_2S_2O_8$) was added to the solution followed by the slow addition of 50 milliliters of a mixture comprising 202 grams of vinyl acetate and 36 grams of butyl acrylate. The polymerization temperature was maintained at 75°–80° C. for 30 minutes after the addition of the 50 milliliter portion of the monomer mixture. The remainder of the monomer mixture was charged to the kettle over a 3–4 hour period while maintaining the polymerization temperature at between 70° C. and 75° C. The contents of the resin kettle were post stirred at 70° C. for 1 hour and then 10 grams of 2 percent formaldehyde sulfoxylate added to the kettle to complete the polymerization.

The kettle contents were allowed to cool to ambient temperature and the latex in the kettle recovered by filtration through a cheese cloth. Less than 1 percent of the polymer product had coagulated. A portion of the latex was cast into a film and the film dissolved in chloroform-d ($CD_3Cl$). Proton-NMR spectroscopy of the chloroform solution did not reveal the presence of any allylic hydrogens, which indicated that the sulfonate product of Example 5 had reacted completely during the polymerization.

A film of the latex was cast onto a microscope slide and air dried for at least 24 hours. A NRL contact angle goniometer, Model 100-00, was employed to measure the contact angle of a drop of deionized water placed onto the film. The contact angle was determined within 10 seconds of the water being placed upon the film and was found to be 52°.

EXAMPLE 12

For purposes of comparison, the emulsion polymerization of Example 11 was performed using 24 grams of sodium lauryl sulfate, (30 percent active) as the sole surfactant. The product was recovered by filtration through a cheese cloth and less than 1 percent of the product was found to have coagulated.

In accordance with the procedure described in Example 11, the contact angle for a drop of water placed on a film prepared from the aforesaid latex was measured. The water droplet was observed to spread immediately with a resulting contact angle of less than 5°.

The contact angle measurements of Examples 11 and 12 show that the latex prepared with the copolymerizable surfactant of Example 5 was less water sensitive than those made from conventional emulsifiers, i.e., sodium lauryl sulfate.

EXAMPLE 13

A vinyl acetate homopolymer was prepared utilizing the sulfonate product of Example 10 containing about 32.6 percent solids as the sole surfactant. A one liter resin kettle was charged with a solution of 20.0 grams of the sulfonate product of Example 10 in 238 grams of deionized water. The solution was heated to 80° C. under a nitrogen atmosphere and 0.5 grams of potassium persulfate ($K_2S_2O_8$) added to the solution. 50 grams of vinyl acetate was added slowly to the resin kettle. The reaction temperature was maintained at 75°0-80° C. for 30 minutes after completing the initial charge of vinyl acetate. Subsequently, 150 grams of vinyl acetate was added to the kettle over 3-4 hours while maintaining the polymerization temperature at about 80° C. The contents of the resin kettle were post stirred for one hour at 85° C., cooled to ambient temperature, and filtered through a cheese cloth. The amount of coagulation found was about one percent. A film of the latex was cast onto a microscope slide and air dried for at least 24 hours. The contact angle for a drop of water placed on the film was measured (as per Example 11) and found to be 53° C.

EXAMPLE 14

The polymerizable surfactant used in this example is represented by graphic formula I where R is allyl, R' is butylene, m is 12, n is 15, and X is monoammonium sulfate (viz., $SO_4^-NH_4^+$).

A monomer mixture was prepared by admixing 132 grams of ethyl acrylate, 62 grams of n-butyl acrylate, 3 grams of acrylic acid, and 6.25 grams of a 48 percent by weight aqueous solution of N-methylolacrylamide.

Deionized water in the amount of 157.7 grams and 2.5 grams of the polymerizable surfactant were admixed with all of the monomer mixture to form a stable emulsion.

A resin kettle was charged with 80.5 grams of deionized water, 1.5 grams of the polymerizable surfactant, 0.6 gram of sodium bicarbonate, and 1 gram of ammonium persulfate. The charged materials were heated to 80° C. under a nitrogen blanket. Over a period of 2 hours and 55 minutes all of the stable emulsion was added to the resin kettle while maintaining the temperature at about 80° C. Upon completion of the addition, the reaction mixture was stirred for one hour at temperatures in the range of from 80° C. to 85° C. after which the reaction mixture was cooled to about room temperature. The reaction mixture was filtered through a preweighed 60 mesh stainless steel screen into a sample bottle. It was found that the screen retained 1.9 grams of coagulum which was discarded. The latex product in the sample bottle comprised 44.6 percent by weight solids. The yield based on monomer weight was 97 percent.

EXAMPLE 15 (COMPARATIVE)

The surfactant used in this example was sulfated nonylphenol ethoxylate (EP-120; GAF Chemical Corp.).

A monomer mixture was prepared by admixing 132 grams of ethyl acrylate, 62 grams of n-butyl acrylate, 3 grams of acrylic acid, and 6.25 grams of a 48 percent by weight aqueous solution of N-methylolacrylamide.

Deionized water in the amount of 155.1 grams and 8.33 grams of the surfactant were admixed with all of the monomer mixture to form a monomer emulsion that was less stable than the corresponding emulsion of Example 14.

A resin kettle was charged with 77.0 grams of deionized water, 5 grams of the surfactant, 0.6 grams of sodium bicarbonate, and 1 grams of ammonium persulfate. The charged materials were heated to 80° C. under a nitrogen blanket. Over a period of 3 hours all of the monomer emulsion was added to the resin kettle while maintaining the temperature at about 80° C. Upon completion of the addition, the reaction mixture was stirred for one hour at temperatures in the range of from 80° C. to 85° C. after which the reaction mixture was cooled to about room temperature. The reaction mixture was filtered through a preweighed 60 mesh stainless steel screen into a sample bottle. It was found that the screen retained 15 grams of coagulum which was discarded. The latex product in the sample bottle comprised 44.1 percent by weight solids. The yield based on monomer weight was 95.9 percent.

EXAMPLE 16

Fabric samples measuring 25.4 centimeters × 25.4 centimeters were cut from 100% cotton interlock knit (style 460) fabric and from 50% cotton/50% polyester knit (style 7421) fabric from Test Fabrics, Inc. of Middlesex, N.J. A first test composition was prepared by admixing 60 grams of the latex product of Example 14 with 340 grams of deionized water. A second test composition was prepared by admixing 60 grams of the latex product of Example 15 with 340 grams of deionized water. A control test composition consisted of deionized water only.

Each fabric sample was weighed, submerged for 30 seconds in a test composition, and wrung out using an Atlas Laboratory Wringer with 11.34 kilograms on the arm. The fabric sample was then briefly submerged in the test composition and wrung out again. The fabric sample was weighed and then hung and dried in a Despatch oven at 149° C. for 7 minutes. The dry fabric sample was lightly pressed and then marked with a grid pattern of straight lines running parallel to the edges of the fabric sample. Lines 5.08 centimeters and 7.62 centimeters, respectively, from each edge of the fabric sample constituted the grid (i.e., eight lines total).

After an overnight conditioning period, all of the fabric samples and additional fabric added as ballast were subjected to five wash-rinse-dry cycles. In each cycle, the fabric samples and the ballast fabric were washed and rinsed in a Kenmore ® Heavy Duty 70 Series Model/Stock No. 110.82873110 washing machine set on "Heavy Soil." Washing was accomplished at 49° C. using 90 grams of AATCC Standard Detergent #124. Rinsing was accomplished at 29° C. Deionized water was used for both washing and rinsing. The rinsed fabric samples and ballast fabric were then dried in a Soft Heat Kenmore ® Model 110.86873100 clothes dryer set on "Less Dry."

The distances between lines of the grid were measured three times near each edge of a fabric sample for a total of twelve measurements per fabric sample. Each set of three measurements was averaged and the percent shrinkage was calculated. The data are shown in Tables 1 and 2 where the sides of a fabric sample along which measurements were taken are abbreviated as follows:
S1 = One easily stretchable side;
S2 = The opposite easily stretchable side;
S3 = One substantially non-stretchable side;
S4 = The opposite substantially non-stretchable side.

TABLE 1

Effects of Latex Treatments on 100% Cotton Fabric

| Latex Product | Percent Shrinkage | | | |
|---|---|---|---|---|
| | S1 | S2 | S3 | S4 |
| Example 14 | 3.75 | 2.50 | 3.75 | 3.75 |
| Example 15 | 7.50 | 7.50 | 7.50 | 10.00 |
| Control (Deionized Water) | −5.25 | −5.00 | 15.00 | 15.50 |

TABLE 2

Effects of Latex Treatments on 50/50 Cotton Polyester Fabric

| Latex Product | Percent Shrinkage | | | |
|---|---|---|---|---|
| | S1 | S2 | S3 | S4 |
| Example 14 | 1.25 | 1.25 | 1.25 | 0.00 |
| Example 15 | 1.25 | 1.25 | 2.50 | 1.25 |
| Control (Deionized Water) | 1.88 | 2.08 | 5.83 | 5.63 |

The data show that the latex prepared with the polymerizable surfactant described in Example 14 was more effective in reducing shrinkage than the latex prepared with the surfactant described in Example 15.

EXAMPLE 17

A vinyl acetate homopolymer was prepared utilizing the sulfonate product of Example 8 containing about 31.8 percent solids as the sole surfactant. A one liter resin kettle was charged with a solution of 26.7 grams of the sulfonate product of Example 8 in 237 grams of deionized water. The solution was heated to 80° C. under a nitrogen atmosphere and 1.0 gram of potassium persulfate was added to the solution. 50 grams of vinyl acetate was slowly added to the resin kettle. The reaction temperature was maintained at 75°-80° C. for 30 minutes after completing the initial charge of vinyl acetate. Subsequently, 150 grams of vinyl acetate was added to the kettle over 3-4 hours while maintaining the polymerization temperature at 70°-87° C. The contents of the resin kettle were post stirred for one hour at 80°-85° C., cooled to ambient temperature, and filtered through a cheese cloth. The amount of coagulation found was less than one percent.

EXAMPLE 18 (COMPARATIVE)

For the purpose of comparison, the emulsion polymerization of vinyl acetate described in Example 17 was performed using as the sole surfactant a mixture of 6.0 grams of TRITON X-405 octylphenoxy polyethoxy ethanol (product of Union Carbide Chemical & Plastics Co.) and 6.0 grams of sodium lauryl sulfate. A one liter resin kettle was charged with a solution of the said surfactant mixture in 250 grams of deionized water. The solution was heated to 80° C. under a nitrogen atmosphere and 0.5 gram of potassium persulfate was added to the solution. 50 grams of vinyl acetate was added slowly to the resin kettle. The reaction temperature was maintained at 75°-80° C. for 30 minutes after completing the initial charge of vinyl acetate. Subsequently, 150 grams of vinyl acetate were added to the kettle over 3-4 hours while maintaining the polymerization temperature at about 80° C. The contents of the resin kettle were post stirred for 30 minutes at 85° C., cooled to ambient temperature and filtered through a cheese cloth. The amount of coagulation found was about four percent.

EXAMPLE 19

100 percent cotton broadcloth was stripped of manufacturer's finishes by three successive washings with high phosphorous TIDE laundry detergent (product of Procter and Gamble Co.) two successive washed with 0.04 percent aqueous acetic acid solution, followed by two water rinses. Swatches of the stripped and dried cloth weighing 13 grams each were padded with the following test solutions:

A. An aqueous control solution containing about 0.25 weight-% of MACOL NP-6, and EO(6) nonylphenol ether surfactant (product of Ppg Industries, Inc.) to enhance penetration of liquid into the fabric.

B. An aqueous solution containing 1% on a dry solids basis of the polymer product of Example 13 and about 0.25 weight-% of MACOL NP-6 surfactant.

C. An aqueous solution containing 3% on a dry solids basis of the polymer product of Example 13 and about 0.25 weight-% of MACOL NP-6 surfactant.

D. An aqueous solution containing 1% on a dry solids basis of the polymer product of Example 14 and about 0.25 weight-% of MACOL NP-6 surfactant.

E. An aqueous solution containing 3% on a dry solids basis of the polymer product of Example 14 and about 0.25 weight-% of MACOL NP-6 surfactant.

F. An aqueous solution containing 1% on a dry solids basis of the polymer product of Example 15 and about 0.25 weight-% of MACOL NP-6 surfactant.

G. An aqueous solution containing 3% on a dry solids basis of the polymer product of Example 15 and about 0.25 weight-% of MACOL NP-6 surfactant.

The fabric swatches were padded with the test solutions to a wet pick up of 130% corresponding to a pick-up of 1.3 weight-% of dry polymer based on weight of fabric from the 1% solutions and to a pick up of 3.0 weight-% of dry polymer based on weight of fabric from the 3% solutions. After padding with the test solutions, the swatches were dried for one minute at about 180° C. in a forced air oven. The dried swatches were then tactilely evaluated for feel or hand and their stiffness rated on a scale of 1 to 4. A rating of 1 being limp; 2 being slightly stiff; 3 being moderately stiff; and 4 being very stiff. The evaluations are as follows:

| Sample No. | Rating |
|---|---|
| A. | 1 |
| B. | 3 |
| C. | 4 |
| D. | 4 |
| E. | 4 |
| F. | 2 |
| G. | 3 |

Fabric stiffness is an advantageous quality particularly when the fabric is to be made into a garment or the like, since a stiffer fabric is more readily cut and sewed. Also, a stiffer fabric is less prone to curling and has a more pleasing drapery effect. As the foregoing results shown, fabric treated with the polymer product of the invention, i.e., Sample Nos. B-E, have a significantly higher stiffness rating than fabric treated with polymer product outside the scope of the invention, i.e., Samples Nos. F and G.

EXAMPLE 20

The procedure of Example 19 was followed except that the swatches after padding with the various test solutions were subjected to two washings with said TIDE detergent and rinsed with water. After drying, the washed swatches were tactilely evaluated for stiffness and rated as described in Example 19. The results of said evaluation are as follows:

| Sample No. | Rating |
|---|---|
| A. | 1 |
| B. | 3 |
| C. | 3 |
| D. | 3 |
| E. | 4 |
| F. | 1 |
| G. | 2 |

The results reported in this Example 20 show clearly that fabric treated with polymer product of the invention, i.e., Sample Nos. B-E, are more resistant to repeated washing than is fabric treated with polymer product outside the scope of the invention, i.e., Sample Nos. F and G, the former retaining a substantial degree of stiffness after two washings as compared with the latter.

Although the present invention has been described with reference to specific details of certain embodiments thereof, it is not intended that such detail should be regarded as limitations upon the scope of the invention, except as and to the extent that they are included in the accompanying claims.

What is claimed is:

1. A polymer product that is prepared by the polymerization of ethylenically unsaturated reactant monomers consisting essentially of from about 90 to about 99 percent by weight alkyl acrylate wherein the alkyl group contains from 1 to about 4 carbon atoms, from about 0.5 to about 5 percent by weight of acrylic acid, and from about 0.5 to about 5 percent by weight of N-methylolacrylamide in the presence of from about 1 to about 5 weight percent, based on the total amount of reactant monomer, of a compound represented by the graphic formula:

R—O—(R'O)$_m$—(EO)$_{n-1}$CH$_2$CH$_2$—X, wherein R is selected from the group consisting of vinyl, allyl, acrylyl, acrylyl(C$_1$-C$_{10}$)alkyl, methacrylyl, methacrylyl(C$_1$-C$_{10}$)alkyl, vinylphenyl, and vinylphenylene(C$_1$-C$_6$)alkyl, R'O is the bivalent radicals derived from cyclic ethers selected from the group consisting of propylene oxide, butylene oxide, styrene oxide, tetrahydrofuran, phenyl glycidyl ether, and mixtures thereof, E is the bivalent ethylene radical, m and n are each numbers of from about 10 to about 50, and X is selected from the group consisting of hydroxyl, chloride, and the anionic groups sulfonate, sulfate, phosphate, acetate, isethionate (and alkali metal salts of such anionic groups).

2. The polymer product of claim 1 wherein said alkyl acrylate is a mixture of two or more alkyl acrylates.

3. The polymer product of claim 2 wherein the alkyl groups of said alkyl acrylates are straight.

4. The polymer product of claim 3 wherein said mixture comprises ethyl acrylate and butyl acrylate.

5. The polymer product of claim 1 wherein:
(a) the alkyl acrylate constitutes from about 94 to about 98 percent by weight of the ethylenically unsaturated reactant monomers;
(b) the acrylic acid constitutes from about 1 to about 3 percent by weight of the ethylenically unsaturated reactant monomers; and
(c) the N-methylolacrylamide constitutes from about 1 to about 3 percent by weight of the ethylenically unsaturated reactant monomers.
(c) the N-methylolacrylamide constitutes from about 1 to about 3 percent by weight of the ethylenically unsaturated reactant monomers.

6. The polymer product of claim 5 wherein the polymerization is conducted in the presence of from about 1.5 to about 3 weight percent, based on the total weight of the ethylenically unsaturated reactive monomer, of said compound.

7. The polymer product of claim 1 wherein the polymerization is free-radical initiated.

8. Textile fabric selected from the group consisting of cotton fabric, cotton/polyester blend fabric, cotton/rayon blend fabric, rayon fabric, and rayon/synthetic blend fabric, wherein said textile fabric comprises the polymer product of claim 1.

9. The textile fabric of claim 8 wherein said fabric is woven.

10. The textile fabric of claim 8 wherein the polymer product constitutes from about 3 to about 15 percent by weight of the textile fabric.

11. A textile fabric having applied thereto a polymer product prepared by the free radical initiated polymerization of reactant monomer selected from vinyl ester monomer, vinyl acetate-acrylic monomer mixtures, ethylene-vinyl acetate monomer mixtures, styrene, styrene-acrylic monomer mixtures, butadiene-acrylonitrile monomer mixtures, vinyl chloride, vinylidene chloride, vinyl fluoride, vinylidene fluorine, or acrylic monomer mixtures, said polymerization being conducted in the presence of from about 1 to about 25 weight percent, based on the total weight of monomer, of a compound represented by the graphic formula:

R—O—(R'O)$_m$—(EO)$_{n-1}$CH$_2$CH$_2$—X wherein R is selected from the group consisting of vinyl, allyl, acrylyl, acrylyl(C$_1$-C$_{10}$)alkyl, methacrylyl, methacrylyl(C$_1$-C$_{10}$)alkyl, vinylphenyl, and vinylphenylene(C$_1$-C$_6$)alkyl, R'O is the bivalent radical derived from cyclic ethers selected from the group consisting of propylene oxide, butylene oxide, styrene oxide, tetrahydrofuran, phenyl glycidyl ether, and mixtures thereof, E is the bivalent ethylene radical, m and n are each numbers of from about 10 to about 50, and X is selected from the group consisting of hydroxyl, chloride, and the anionic groups sulfonate, sulfate, phosphate, acetate, isethionate (and alkali metal salts of such anionic groups).

12. The textile fabric of claim 11 wherein the vinyl ester monomer is selected from the group consisting of vinyl formate, vinyl acetate, vinyl proprionate, vinyl butyrate, vinyl isobutyrate, vinyl valerate, vinyl caproate, allyl acetate, allyl proprionate, allyl lactate, and mixtures thereof.

13. The textile fabric of claim 12 wherein the vinyl ester monomer is vinyl acetate or allyl acetate.

14. The textile fabric of claim 11 wherein the graphic formula, R is allyl or vinyl, R'O is the bivalent radical derived from butylene oxide, propylene oxide, or mixtures thereof, and X is sulfate or sulfonate.

15. The textile fabric of claim 11 having applied thereto from about 1 to about 10 percent by weight of polymer product based on the weight of fabric.

16. The textile fabric of claim 15 having applied thereto from about 2 to about 5 percent by weight of polymer product based on the weight of fabric.

17. A textile fabric having applied thereto a polymer product prepared by the free radical initiated polymerization of vinyl acetate or allyl acetate in the presence of from about 1 to about 25 percent by weight based on weight of said vinyl acetate or allyl acetate of a compound represented by the graphic formula:

$$R-O-(R'O)_m-(EO)_{n-1}CH_2CH_2-X$$

wherein R is allyl or vinyl, R'O is the bivalent radical derived from butylene oxide, propylene oxide, or mixtures thereof, E is the bivalent ethylene radical, m and n are each numbers of from about 10 to about 50, and X is sulfate or sulfonate.

18. The textile fabric of claim 17 having applied thereto from about 1 to about 10 percent by weight of said polymer product based on the weight of said fabric.

19. The textile fabric of claim 18 having applied thereto from about 2 to about 5 percent by weight of said polymer product based on the weight of said fabric.

20. Textile fabric selected from the group consisting of cotton fabric, cotton/polyester blend fabric, cotton/rayon blend fabric, rayon fabric, and rayon/synthetic blend fabric, wherein said textile fabric comprises the polymer product of claim 2.

21. Textile fabric selected from the group consisting of cotton fabric, cotton/polyester blend fabric, cotton/rayon blend fabric, rayon fabric, and rayon/synthetic blend fabric, wherein said textile fabric comprises the polymer product of claim 3.

22. Textile fabric selected from the group consisting of cotton fabric, cotton/polyester blend fabric, cotton/rayon blend fabric, rayon fabric, and rayon/synthetic blend fabric, wherein said textile fabric comprises the polymer product of claim 4.

23. Textile fabric selected from the group consisting of cotton fabric, cotton/polyester blend fabric, cotton/rayon blend fabric, rayon fabric, and rayon/synthetic blend fabric, wherein said textile fabric comprises the polymer product of claim 5.

24. Textile fabric selected from the group consisting of cotton fabric, cotton/polyester blend fabric, cotton/rayon blend fabric, rayon fabric, and rayon/synthetic blend fabric, wherein said textile fabric comprises the polymer product of claim 6.

25. Textile fabric selected from the group consisting of cotton fabric, cotton/polyester blend fabric, cotton/rayon blend fabric, rayon fabric, and rayon/synthetic blend fabric, wherein said textile fabric comprises the polymer product of claim 7.

26. The textile fabric of claim 8 wherein said fabric is knitted.

27. The textile fabric of claim 8 wherein said fabric is nonwoven.

28. The textile fabric of claim 8 wherein the polymer product constitutes from about 7 to about 11 percent by weight of the textile fabric.

* * * * *